(12) United States Patent
Ott et al.

(10) Patent No.: US 7,407,198 B2
(45) Date of Patent: Aug. 5, 2008

(54) RADIAL ROTARY TRANSFER ASSEMBLY

(75) Inventors: Stephan Ott, Wiesbaden (DE); Thomas Bohrmann, Bad Schwalbach (DE)

(73) Assignee: GAT Gesellschaft fur Antriebstechnik mbH (DE)

( * ) Notice: Subject to any disclaimer, the term of this patent is extended or adjusted under 35 U.S.C. 154(b) by 382 days.

(21) Appl. No.: 10/966,557

(22) Filed: Oct. 15, 2004

(65) Prior Publication Data

US 2005/0111770 A1    May 26, 2005

(30) Foreign Application Priority Data

Oct. 24, 2003    (DE) .............................. 103 49 968

(51) Int. Cl.
*F16L 27/00* (2006.01)
*F16L 39/04* (2006.01)

(52) U.S. Cl. .................. 285/121.4; 285/121.1; 285/190

(58) Field of Classification Search .................. 285/13, 285/14, 96, 106, 121.1, 121.2, 121.3, 121.4, 285/123.3, 190; 137/580
See application file for complete search history.

(56) References Cited

U.S. PATENT DOCUMENTS

| | | | |
|---|---|---|---|
| 3,333,598 A * | 8/1967 | Schott ......................... 137/312 |
| 3,503,469 A | 3/1970 | Renz et al. |
| 4,111,467 A * | 9/1978 | de Fremery .............. 285/121.3 |
| 4,192,559 A | 3/1980 | Hewitt |
| 4,408,766 A | 10/1983 | Paech |
| 4,635,969 A | 1/1987 | Jackson |
| 4,844,124 A * | 7/1989 | Stich et al. .................. 137/580 |
| 5,052,720 A * | 10/1991 | Yoda ........................... 285/14 |
| 5,080,401 A * | 1/1992 | Stich .......................... 285/190 |
| 5,702,130 A * | 12/1997 | Jostein ......................... 285/96 |
| 5,788,288 A * | 8/1998 | Jostein ......................... 285/93 |
| 5,895,077 A * | 4/1999 | Sigmundstad ................. 285/96 |
| 6,073,970 A * | 6/2000 | Ott et al. ....................... 285/13 |
| 6,390,478 B1 * | 5/2002 | Sigmundstad ............... 277/362 |
| 6,406,065 B1 * | 6/2002 | Ott et al. .................. 285/120.1 |
| 6,485,062 B2 * | 11/2002 | Omiya et al. ............ 285/121.1 |

(Continued)

FOREIGN PATENT DOCUMENTS

DE    1093149 B    11/1960

(Continued)

*Primary Examiner*—James M Hewitt
(74) *Attorney, Agent, or Firm*—Stevens & Showalter LLP

(57) ABSTRACT

A radial rotary transfer assembly including at least one rotor (4) and at least one stationary part (1) The rotor (4) has at least two sealing surfaces (16, 18). Two sliding rings (2, 3) having at least two sealing surfaces (15, 17) are arranged between the stationary part and the rotor. The sealing surfaces (15, 17) of the sliding rings (2, 3) co-operate with the rotor sealing surfaces (16, 18), and with at least one radial through-flow duct (10) between the pairs (15, 16; 17, 18) of co-operating sealing surfaces. In order to structurally design a radial rotary transfer assembly in such a way that the installation thereof in matching centers and retro-fitment thereof on existing apparatuses is simplified and does not fail because of the small space available it is proposed in accordance with the invention that the normals ($n_{16}$, $n_{18}$) to the sealing surfaces of the rotor (4) face axially away from each other, wherein the normals ($n_{15}$, $n_{17}$) to the sealing surfaces of the sliding rings (2, 3) are directed axially towards each other.

15 Claims, 4 Drawing Sheets

U.S. PATENT DOCUMENTS

| | | | |
|---|---|---|---|
| 2002/0000251 A1* | 1/2002 | Suzuki et al. | 137/580 |
| 2002/0017785 A1* | 2/2002 | Omiya et al. | 285/121.3 |

FOREIGN PATENT DOCUMENTS

| | | | |
|---|---|---|---|
| DE | 3927775 A1 | | 3/1990 |
| DE | 4133262 A1 | * | 4/1993 |
| FR | 2551832 A1 | | 3/1985 |
| GB | 1208793 A | | 10/1970 |
| JP | 09196265 A | | 7/1997 |
| WO | WO 98/31963 | | 7/1998 |

* cited by examiner

RADIAL ROTARY TRANSFER ASSEMBLY

FIELD OF THE INVENTION

This application claims priority to German Patent Application 10349968.7, filed Oct. 24, 2003.

The invention concerns a radial rotary transfer assembly comprising at least one rotor and at least one stationary part, wherein the at least one rotor has at least two axially spaced sealing surfaces and wherein two sliding rings with overall at least two sealing surfaces are arranged between the stationary part and the rotor, wherein the sealing surfaces of the sliding rings co-operate with the rotor sealing surfaces, and with at least one radial feed passage between the pairs of co-operating sealing surfaces.

BACKGROUND OF THE INVENTION

Rotary transfer assemblies for transferring fluids from a stationary machine part into a rotating machine part are known from the state of the art. The technical problem to be resolved by all rotary transfer assemblies is that of providing a sealed transition between two mutually rotating parts.

BACKGROUND OF THE INVENTION

The rotary transfer assemblies known from the state of the art are either axial transfer assemblies in which the fluid is passed along the axis of rotation or parallel thereto into the rotating machine part, or radial rotary transfer assemblies. Japanese patent specification JP 09196265 A which the present application takes as its basic starting point discloses such a radial rotary transfer assembly in which the fluid is passed from the stationary machine part into the rotating part in a direction perpendicular to the axis of rotation of the rotating part. In that respect, provided on the rotating part, also referred to hereinafter as the rotor, are two annular projections having axial sealing surfaces whose surface normals point in the direction of the axis of rotation and which extend in an annular configuration around the axis of rotation of the rotor. In that arrangement the sealing surfaces of the two annular projections face towards each other. The sealing surfaces of two sliding rings bear against the sealing surfaces of the rotor. The sliding rings are secured to the stationary part to prevent them from rotating with the rotor and their sealing surfaces are pressed against the sealing surfaces of the rotor by means of springs which are supported against a portion of the stationary part. The fluid is fed through a duct between the two sliding rings in a direction perpendicular to the axis of rotation of the rotor. The fluid is thus prevented from escaping by means of the sealing surfaces, which bear flat against each other, of the rotor and the two sealing rings, and by seals between the stationary part and the sliding rings.

The rotary transfer assembly known from JP 09196165 A is of a very complex and bulky structure. The part which carries the sliding sealing surfaces and which is connected to the shaft comprises two axially spaced rotor rings, with each of which is associated a respective sliding ring. The rotor rings have to be fixed on the shaft in sealed relationship. Associated with each rotor ring is its own sliding ring which admittedly does not rotate therewith but which is arranged on the shaft in an axially floating and resiliently biased condition in order always to ensure sealing contact in respect of its sliding sealing surfaces, irrespective of any component and assembly tolerances. For mounting and supporting the sliding rings the stationary part has a radially inwardly projecting flange which is arranged between the sliding rings and which presses the sliding rings against the rotor ring by way of springs. That structure takes up a relatively large amount of space both in the axial and also the radial direction.

Radial (and also axial) rotary transfer assemblies are used inter alia for the internal coolant feed in machine tools. It will be noted that a disadvantage of those rotary transfer assemblies is that they are relatively bulky and correspondingly take up space on a tool spindle. That is a nuisance in particular in modern machining centers which in any case require space for tool magazines and turret heads. Retro-fitting a coolant feed by replacing a spindle without devices for the coolant feed by a spindle with corresponding devices is often not viable because of the space additionally required for the rotary transfer assembly.

In comparison with that state of the art, the object of the present invention is to structurally design a radial rotary transfer assembly in such a way that the installation thereof in machining centers and retro-fitment thereof on existing apparatuses is simplified and does not fail because of the small space available.

SUMMARY OF THE INVENTION

That object is attained by the provision of a radial rotary transfer assembly comprising at least one rotor and at least one stationary part, wherein the at least one rotor has at least two sealing surfaces and wherein two sliding rings with overall at least two sealing surfaces are arranged between the stationary part and the rotor, wherein the sealing surfaces of the sliding rings co-operate with the rotor sealing surfaces, and with at least one radial feed passage between the pairs of co-operating sealing surfaces, wherein the normals to the sealing surfaces of the rotor face axially away from each other, wherein the normals to the sealing surfaces of the sliding rings are directed axially towards each other.

In this configuration the sliding sealing surfaces of the rotor can be arranged on one and the same component and a particular advantage with this structure is that it can be afforded with a reduced axial height.

A particularly preferred embodiment of the invention is one in which the axial height, that is to say the dimension of the rotary transfer assembly in a direction parallel to the axis of rotation of the rotor, is less than 40 mm, preferably less than 20 mm, and particularly preferably is 18 mm. By suitable optimisation of the individual components, with current nominal diameters of corresponding shafts of between 20 mm and about 100 mm, that can be readily achieved on the basis of the structure according to the invention.

Such a small axial structural height permits installation in machine tools directly between the spindle bearings even when there is a short distance between the bearings of the shaft, and therefore does not require any additional space at all. By virtue of their being arranged between the bearings, it is appropriate if the rotary transfer assemblies used at those locations are completely leak-free in order not to adversely affect the adjacent bearings.

Therefore, in order to prevent adjacent components from being adversely affected, it is desirable if the leakage spaces of the rotary transfer assembly, which are axially outside the sliding ring seals, are sealed off with annular leakage space seals which press against the shaft.

In general terms, it is advantageous if the ratio of the diameter of the shaft to the axial height of the rotary transfer assembly is greater than 1, preferably greater than 1.5 and particularly preferably greater than 2. That ensures comparatively small installation dimensions of the rotary transfer assemblies, even for large shaft diameters.

It is desirable if the maximum ratio between the radial thickness of the rotary transfer assembly and the diameter of the shaft is less than ⅓, preferably less than ⅕ and particularly preferably less than ⅙. In that way the radial installation dimension is maintained within limits even when comparatively large shafts are involved.

It is further desirable if the rotor is made in one piece. That saves on time and costs in production and in particular in assembly of the rotor.

A preferred embodiment of the invention is one in which the rotor has an annular projection whose ends or parts thereof form the sealing surfaces. As both sealing surfaces are part of the annular projection, less space is taken up than when using a respective carrier for each sealing surface. In addition the annular projection can be of a relatively thin configuration in the axial direction as the sealing surfaces lie on the oppositely disposed cover surfaces of the annular projection so that the forces exerted on the sealing surfaces compensate each other. That also saves on axial structural height. It will be noted that the axial height of the projection must be sufficient also to be able to dispose between the sliding sealing surfaces which are formed by the ends of the projection, a radial bore or a passage which can also be of a non-round, narrow cross-section, for example a slot.

In an alternative embodiment of the invention the rotor is of a multi-part structure, comprising at least one core and at least one ring pushed thereon. In that case the ends of the pushed-on ring or parts thereof form the sealing surfaces. This design configuration is advantageous as it allows simpler manufacture and assembly of the rotor. In that arrangement, the pushed-on ring preferably forms the annular projection or has the annular projection on which the axial sealing surfaces are arranged.

It is particularly advantageous in that respect if the at least one pushed-on ring is connected to the at least one core by way of at least one entrainment pin. In that way the rotary movements of the core and the pushed-on ring are coupled to each other.

A particularly preferred embodiment of the invention is one in which the stationary part is of the cross-section of a U-shaped profile and forms an annularly peripherally extending clamp, wherein the limbs of the U-shaped profile axially embrace from the outside the sliding rings and the rotor or parts thereof. That affords a particularly compact structural shape.

In that respect it is desirable if the stationary part comprises a ring of an L-shaped profile cross-section and a ring which is fixed thereto and which supplements the L-shaped profile to form a U-shaped profile. In that way the stationary part, except for the ring, can be made in one piece. After assembly of the other parts the ring is fixed in position and supplements the L-shaped profile member to constitute a U-shaped profile member which embraces the sliding rings and the rotor or parts thereof. Preferably, at its outside, the ring has a screwthread by means of which the ring can be screwed into the L-shaped profile. Alternatively it can be fixed to the L-shaped profile with additional screws. It is equally possible to envisage a welded, soldered or adhesive connection.

Desirably in that case both the (integral) rotor and also the stationary part of the rotary transfer assembly extend axially over the full height of the rotary transfer assembly, wherein the rotor is arranged radially within the stationary part and an annular projection on the rotor radially overlaps with inwardly projecting U-limbs of the stationary part and arranged between those overlapping parts are the sliding rings of which one could also be formed integrally with the stationary part.

Preferably the sliding ring seals are hydrostatically compensated. When a sliding ring with oppositely disposed end faces of equal size has a fluid flowing therearound, which is subjected to the effect of pressure, then the forces acting on the sliding ring from both sides are of equal magnitude and the sliding ring is free of forces. The hydrostatic pressure on a sealing surface of a sliding ring, which sealing surface runs against the oppositely disposed sliding surface of a rotating part, decreases with the spacing of the fluid-filled chamber and is zero at the other end of the sliding ring. Therefore, with the same area in respect of the top and bottom sides of the sliding ring, the force on the side of the sliding surface is lower than the force on the opposite side. If that force unbalance is not compensated, the sliding ring is very firmly pressed against the second sealing surface by the pressurised fluid, in addition to the springs, and in the extreme situation can run dry and seize. That can be avoided if the sizes of the surfaces around which the fluid flows, on the top and bottom sides of the sliding ring, are such that the forces acting thereat compensate for each other, although the pressure on the sliding surfaces falls in the radial direction. In that respect it is advantageous if the sliding ring seals are hydrostatically compensated almost completely, that is to say in practice between 90% and 100%, preferably at about 95%.

For passing through specific fluids, a preferred embodiment of the invention is one in which the sliding rings are made from a technical ceramic or carbide or hard metal. Such ceramics or also carbide or hard metals are of high strength and have good sliding properties while they are subjected to only a slight amount of wear. As an alternative thereto, as is known from the state of the art, the sliding rings can be made from a steel/bronze alloy. Further features, advantages and possible uses of the present invention will be apparent from the description hereinafter of a preferred embodiment together with the accompanying drawings in which:

DETAILED DESCRIPTION OF THE INVENTION

Figure 1:
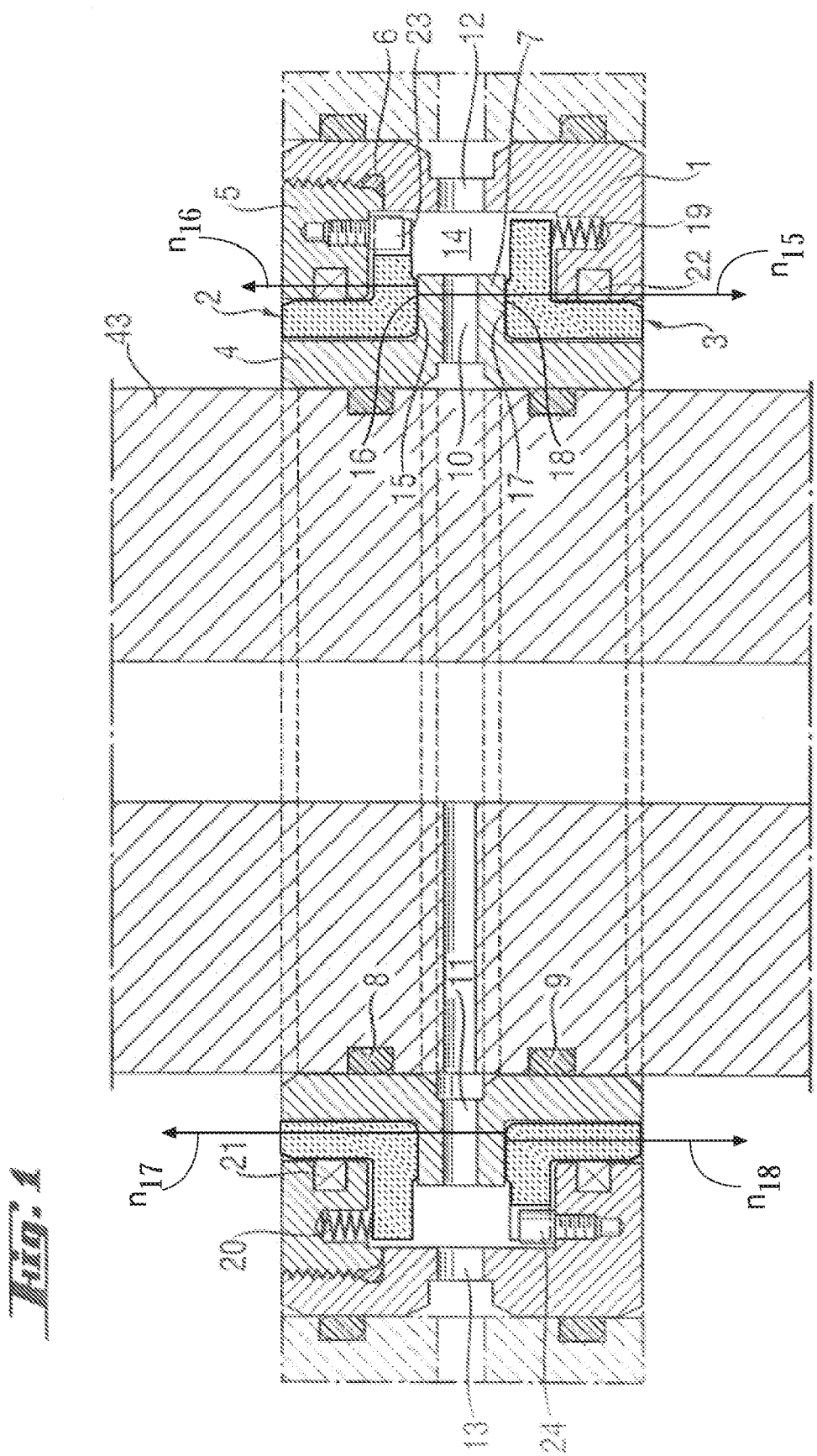
FIG. 1 shows a preferred embodiment of the present invention.
Figure 2:
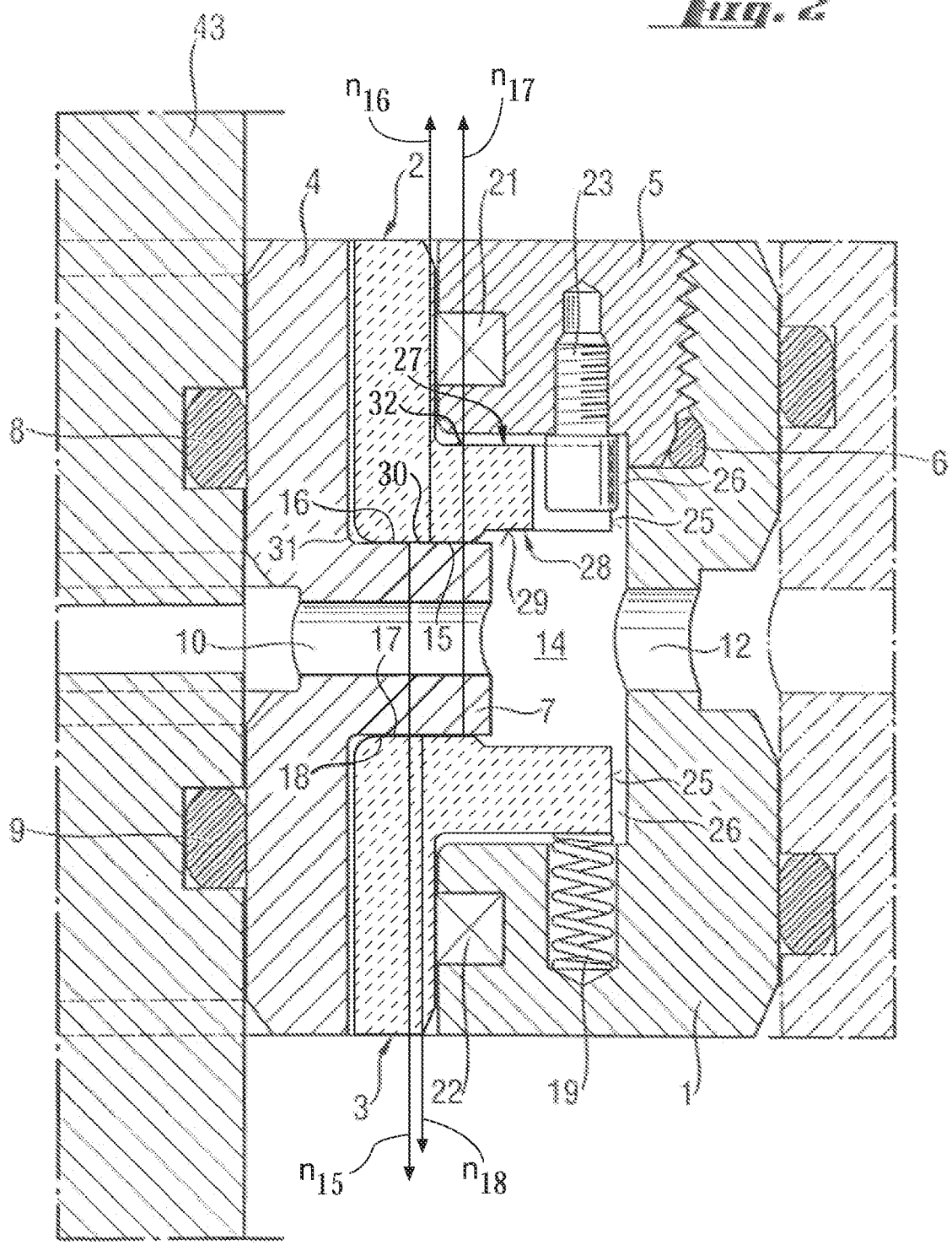
FIG. 2 shows an enlarged broken-away view of the embodiment of the invention shown in FIG. 1.

The embodiment of the rotary transfer assembly according to the invention, which is shown in FIGS. 1 and 2, comprises four essential functional elements, the stationary part 1, the sliding rings 2, 3 and the rotor or rotating part 4. The stationary part 1 of the rotary transfer assembly is so designed that it forms an annularly peripherally extending clamp which at least partially embraces the other elements and holds them together. In order to permit assembly of the two sliding rings 2, 3 and the rotor 4 and in order to support them at both sides, the upper end of the stationary part 1 is provided by a ring 5 which can be screwed in. So that no fluid can pass outwardly by way of the screwthread of the ring 5, the screwthread is sealed off at the lower end by a peripherally extending O-ring 6. In the illustrated embodiment the rotor 4 is in one piece and is of a substantially hollow-cylindrical shape, wherein an annular projection 7 is provided on the outside of the cylinder symmetrically at half the height. The hollow-cylindrical rotor 4 can be pushed over a hollow shaft, wherein two radially peripherally extending O-ring seals 8, 9 seal off the rotor with respect to the shaft. If the rotor is to be fixed additionally to its seat on the O-rings 8, 9 on the shaft, it can be fixed by adhesive or screws. The stationary part 1 and the rotor 4 are of approximately the same axial height or length and are arranged in the same radial plane. They thereby also define the overall axial height of the rotary transfer assembly.

In order to permit the fluid to flow into the shaft, the rotor in the illustrated embodiment is provided with two oppositely arranged through-flow ducts 10, 11 which are arranged symmetrically in the center of the annular projection 7. It will be appreciated that it is also possible to provide only one duct or a plurality of peripherally distributed ducts as the space 14 annularly surrounds the projection 7 as an interconnected volume.

In order to prevent the fluid from escaping between the rotor 4 and the shaft the O-ring seals 8, 9 are arranged in the axial direction on both sides of the through-flow ducts 10, 11. The hollow cylinder of the rotor 4 is substantially of such dimensions that its outside diameter is smaller than the inside diameter of the stationary part 1. Only the annular projection 7 projects with its outside diameter into the annular clamp formed by the stationary part 1.

Just like the rotor 4 the stationary part 1 has through-flow ducts 12, 13 which communicate the outside of the stationary part 1 with the internal space 14 of the clamp formed by the stationary part 1. The fluid flows out of the internal space 14 of the clamp through the through-flow ducts 10, 11 in the rotor 4 into the shaft, or also in the reverse direction.

In order to provide a sealing effect in respect of the internal space 14 of the stationary part 1 and the through-flow ducts 10, 11, 12, 13 in relation to an external region of the rotary transfer assembly, a respective sliding ring seal is provided above and below the through-flow ducts 10, 11, 12, 13. The sliding ring seals substantially comprise two respective sliding surfaces 15, 16 and 17, 18 respectively which slide or run against each other. If firstly only the upper sliding ring seal is considered, it will be seen that an L-shaped sliding ring 2 is arranged between the stationary part 1 and the rotor 4; the sliding ring 2 is carried with a small clearance between the stationary part 1 and the rotating part 4. One of the limbs of the L-shaped sliding ring 2 extends radially outwardly in perpendicular relationship to the axis of rotation. At the underside of its limb which is perpendicular to the axis of rotation, the sliding ring 2 has an annularly peripherally extending projection 30 whose flat lower surface 15 forms the first sealing surface of the sliding ring seal. The sealing surface 15 of the sliding ring 2 slides against a second sliding surface 16 formed by one of the cover surfaces of the annular projection 7 of the rotor 4. A normal n16 to the sealing surface 16 and a normal n18 to the sealing surface 18 extend axially in opposite directions from one another. A normal n5 to the sealing surface 15 and a normal n17 to the sealing surface 17 extend axially toward one another. The second sliding ring seal beneath the through-flow ducts 10, 11, 12, 13 has identical features to the first sliding ring seal, but it is mirrored around the axis of the through-flow ducts 10, 11, 12, 13. So that the sealing surfaces 15, 16 and 17, 18 respectively which slide against each other can have a sealing effect, the sliding rings 2, 3 are pressed against the sealing surfaces 16, 18 of the annular projection 7 by springs 19, 20 which are distributed around the periphery of the seals and which are supported against the stationary part 1. The second sides of the L-shaped sliding rings 2, 3 are sealed in relation to the stationary part 1, by means of annular seals 21, 22. In that arrangement, the sealing rings 21, 22 are arranged at the limbs of the L-shaped sliding rings 2, 3, those limbs being parallel to the axis of rotation. The sealing rings 21, 22 are of a substantially U-shaped cross-section so that the sliding rings 2, 3 can be easily displaced along the sealing rings 21, 22. In order to prevent the sliding rings 2, 3 from being rotationally entrained with the rotor 4, provided on the stationary part 1 are pins 23, 24 which project from the upper and lower limbs respectively of the stationary part 1 into the internal space 14 and engage through the sliding rings 2, 3 so that they can no longer be rotated with respect to the stationary part 1.

In the illustrated embodiment the sliding rings 2, 3 are made from a technical ceramic. Those ceramics exhibit good sliding properties because they are of high strength and experience low abrasion wear.

The L-shaped configuration of the sliding rings 2, 3 and the fact that their limbs which are directed in perpendicular relationship to the axis of rotation have the fluid flowing therearound both on the top side 27 and also on the underside 28 permits hydrostatic compensation of the sliding rings 2, 3. The function of hydrostatic compensation can be particularly easily understood by referring to FIG. 2. The radially outwardly disposed end 25 of the limb of the L-shaped sliding ring 3, which limb is perpendicular to the axis of rotation, is at a sufficient spacing from the stationary part 1 so that there is formed a duct 26 through which the fluid can flow out of the internal space 14 on to the top side 27 of the limb which is perpendicular to the axis of rotation. In that respect the pressure of the fluid is constant and is of equal magnitude on all sides of the sliding ring 3. The force which, in addition to the force of the springs 20, acts on the surface 32 of the top side 27 of the limb which is perpendicular to the axis of rotation, is equal to the product of the pressure and the size of the upper surface 32. A hydrostatic force also acts on the underside 28 of the limb which is perpendicular to the axis of rotation. The surface of the underside 28 is composed of two portions: the surface 29 of the limb between the radially outwardly disposed end 25 and the beginning of the annular projection 30 and the sealing surface 15 of the annular projection 30. The force acting on the surface 29 is again equal to the product of the pressure of the fluid and the size of the surface 29. To calculate the force on the sealing surface 15 in contrast it is necessary to take account of the fact that the pressure decreases along the sealing surface 15 with increasing distance from the internal space 14. The force acting on the surface is then calculated as the integral of the pressure over the surface area. As the sealing surface 15, in co-operation with the sealing surface 16 of the rotor, prevents the fluid from escaping into the region 31 behind the annular projection 30, no hydrostatic force acts on the limb there. The force which acts overall on the underside 28 of the limb is equal to the sum of the two contributions. If the sum of the surface 25 and the sealing surface 15 1s equal to the upper surface 27 of the limb, then effectively a force acts on the limb from above by virtue of the reduction in pressure along the sealing surface 15. The position of the sealing surface is now so selected that the forces acting on the limb from below and from above just cancel each other out. That condition is referred to as hydrostatic compensation. In the illustrated embodiment the second sliding ring 3 is also hydrostatically compensated.

In the compensated condition the sealing rings 2, 3 are only pressed against the sealing surfaces 16, 18 by the springs 19, 20 so that the sliding ring seals are prevented from running dry.

Figure 3:
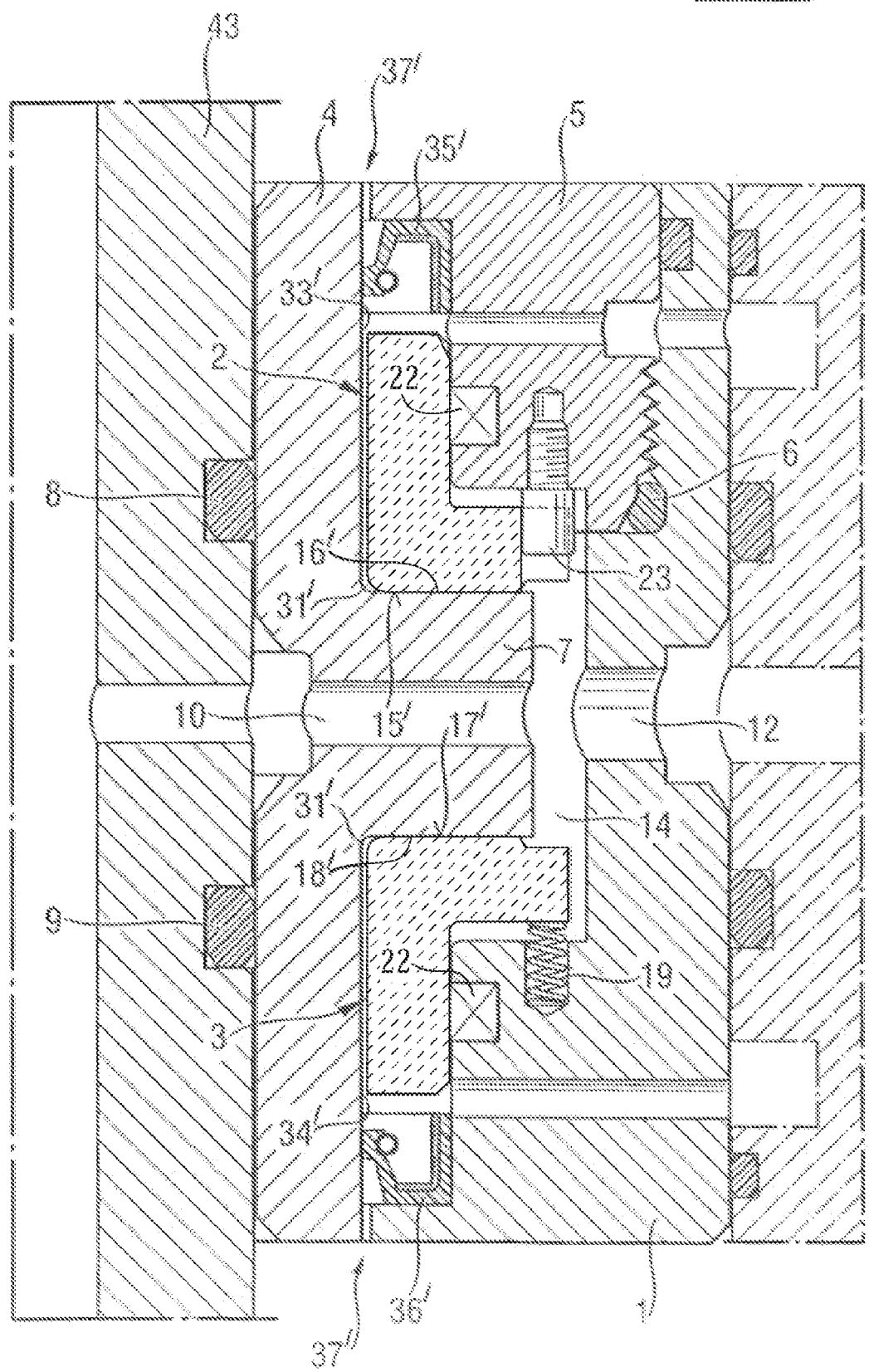
FIG. 3 shows a second embodiment of the present invention.

FIG. 3 shows a further embodiment of the invention in which the leakage spaces 31', 33', 34', outside the sliding ring seals 15', 16' and 17', 18' respectively, are additionally sealed off with annular leakage space seals 35', 36' with respect to the area 37' surrounding the rotary transfer assembly. In that way the fluid which inevitably escapes through the sliding ring seals (15', 16' and 17', 18' respectively) cannot pass into the region (37') outside the rotary transfer assembly.

Figure 4:
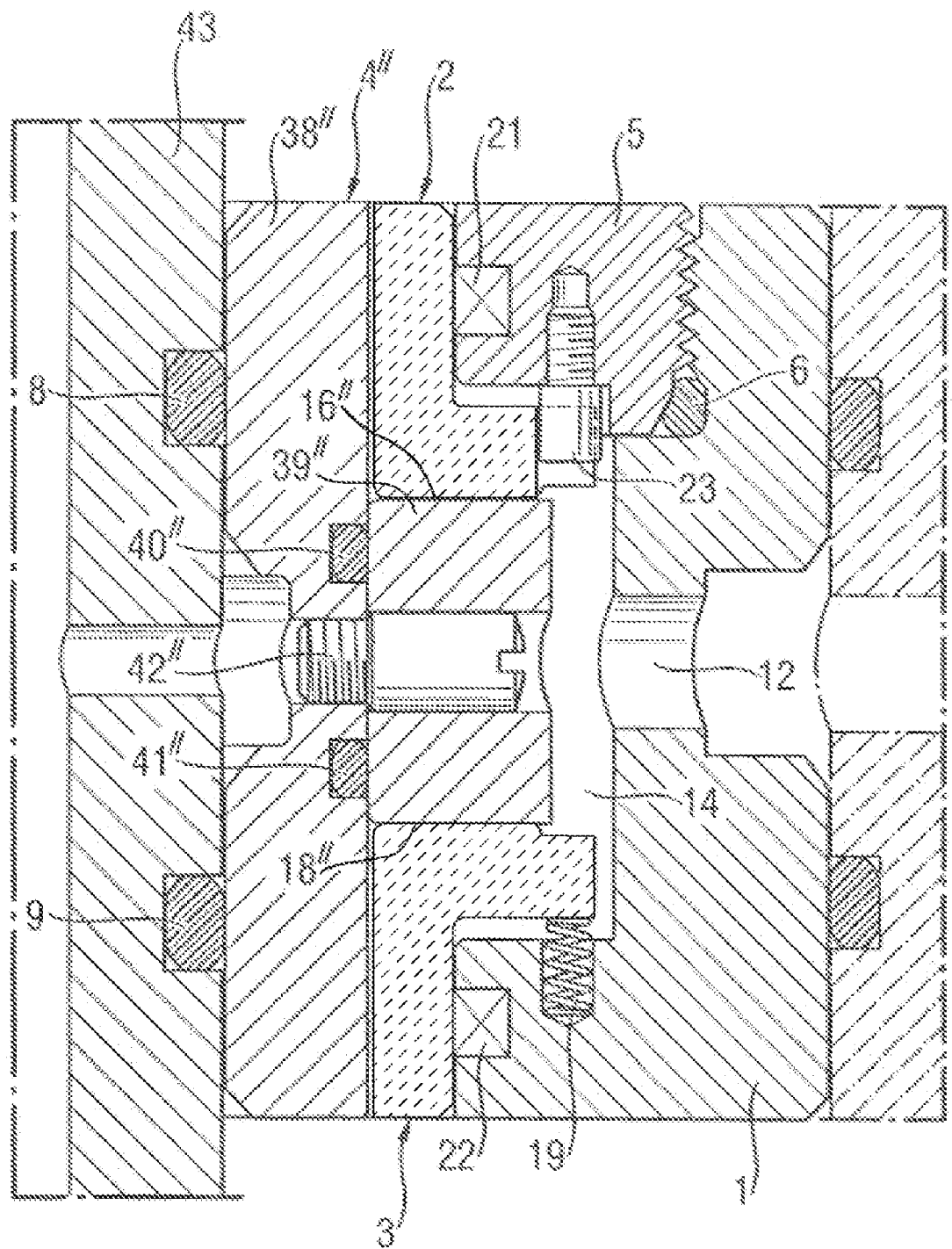
FIG. 4 shows an alternative embodiment of the present invention.

FIG. 4 shows an alternative configuration of the embodiment of the rotary transfer assembly as shown in FIGS. 1 and 2, in which the rotor 4" is of a two-part configuration. It is composed of a hollow-cylindrical core 38" and a ring 39" which is pushed on to the core 38" to the half-height position so that the two parts 38" and 39" of the rotor 4" are together of approximately the same external shape as the one-piece rotor 4 of FIGS. 1 and 2. The pushed-on ring 39" has a clearance in relation to the core 38" and the transition between the two elements 38", 39" is sealed off in relation to the surrounding region by means of two O-rings 40" and 41". The pushed-on ring 39" has through-flow bores for the fluid which are aligned with the bores of the core 38" so that the fluid can flow into the shaft. So that the pushed-on ring 39" can rotate together with the shaft and the core 38" of the rotor 4" it is connected to the core 38" by means of two entrainment pins 42" arranged on mutually opposite sides of the rotary transfer assembly. As in the case of the annular projection 7 of the one-piece rotor 4 the end faces of the pushed-on ring 39" also form the sealing surfaces 16", 18" of the rotor 4".

The invention claimed is:

1. A radial rotary transfer assembly comprising:
   at least one stationary part (1);
   at least one rotor (4) comprising at least two sealing surfaces (16, 18) having normals (n16, n18);
   two sliding rings (2, 3) with overall at least two sealing surfaces (15, 17) having normals (n15, n17) arranged between the stationary part and the rotor, wherein the sealing surfaces (15, 17) of the sliding rings (2, 3) co-operate with the rotor sealing surfaces (16, 18) defining sliding ring seals;
   at least one radial through-flow duct (10) between the pairs (15, 16; 17, 18) of co-operating sealing surfaces, characterised in that the normals (n16, n18) to the sealing surfaces of the rotor (4) face axially away from each other and the normals (n15, n17) to the sealing surfaces of the sliding rings (2, 3) are directed axially towards each other, wherein the sliding ring seals are hydrostatically compensated within a range of from about 90% to about 100%; and
   wherein the stationary part (1) is of the cross-section of a U-shaped profile and forms an annularly peripherally extending clamp, wherein the limbs of the U-shaped profile axially embrace from the outside the sliding rings (2, 3) and the rotor (4).

2. A radial rotary transfer assembly as set forth in claim 1 characterised in that the rotor (4) is in one piece.

3. A radial rotary transfer assembly as set forth in claim 1 or claim 2 characterised in that the rotor (4) has an annular projection (7) having the sealing surfaces.

4. A radial rotary transfer assembly as set forth in claim 1 characterised in that the stationary part (1) comprises a ring of an L-shaped profile cross-section and a ring (5) which is fixed thereto and which supplements the L-shaped profile to form a U-shaped profile.

5. A radial rotary transfer assembly as set forth in one of claims 1 or 4 characterised in that the sliding rings (2, 3) are arranged between the limbs of the U-shaped stationary part (1) and an annular projection (7) of the rotor (4).

6. A radial rotary transfer assembly as set forth in claim 1 characterised in that the sliding ring seals are hydrostatically compensated at about 95%.

7. A radial rotary transfer assembly as set forth in claim 1 characterised in that the radial rotary transfer assembly is of an axial height of less than 40 mm.

8. A radial rotary transfer assembly as set forth in claim 1 characterised in that the ratio of the nominal width to the axial height of the rotary transfer assembly is greater than 1.

9. A radial rotary transfer assembly as set forth in claim 1 characterised in that the maximum ratio between the radial thickness of the rotary transfer assembly and the nominal width thereof is less than ⅓.

10. A radial rotary transfer assembly as set forth in claim 1 characterised in that the sliding rings (2, 3) are made from a technical ceramic or hard metal.

11. A radial rotary transfer assembly as set forth in claim 1 characterised in that leakage spaces (31', 34') which are outside the sliding ring seals (17', 18') and leakage space (33'), which is outside the sliding ring seal (15', 16') of the rotary transfer assembly are sealed in relation to a surrounding region (37') with annular leakage space seals (36'35', respectively.

12. A radial rotary transfer assembly as set forth in claim 1 -characterised in that the rotor (4") is of a multi-part construction and has at least one core (38") and at least one pushed-on ring (39"), wherein the ends of the pushed-on ring (39") or parts thereof form or carry the sealing surfaces.

13. A radial rotary transfer assembly as set forth in claim 12 characterised in that the at least one pushed-on ring (39") is connected to the at least one core (38") with at least one entrainment pin (42").

14. A radial rotary transfer assembly as set forth in claim 1 characterised in that the rotor (4") is of a multi-part construction and has at least one core (38") and at least one ring (39") fitted on the core, wherein the ends of the fitted-on ring (39") or parts thereof form or carry the sealing surfaces.

15. A radial rotary transfer assembly as set forth in claim 14 characterised in that the at least one fitted-on ring (39") is connected to the at least one core (38") with at least one entrainment pin (42").

* * * * *

UNITED STATES PATENT AND TRADEMARK OFFICE
CERTIFICATE OF CORRECTION

PATENT NO.         : 7,407,198 B2                              Page 1 of 1
APPLICATION NO.    : 10/966557
DATED              : August 5, 2008
INVENTOR(S)        : Stephan Ott and Thomas Bohrmann It is certified that error appears in the above-identified patent and that said Letters Patent is hereby corrected as shown below:

Col. 5, line 52, "A normal n5 to the" should read --A normal n15 to the--.

Col. 6, line 51, "sealing surface 15 1s" should read --sealing surface 15 is--.

Col. 8, line 33,
"12. A radial rotary transfer assembly as set forth in claim 1 -characterised in that the rotor (4") is of a multi-part construction and has at least one core (38") and at least one pushed-on ring (39"), wherein the ends of the pushed-on ring (39") or parts thereof form or carry the sealing surfaces."

Should read

--12. A radial rotary transfer assembly as set forth in claim 1 characterised in that the rotor (4") is of a multi-part construction and has at least one core (38") and at least one pushed-on ring (39"), wherein the pushed-on ring (39") has the sealing surfaces.--.

Signed and Sealed this

Thirtieth Day of March, 2010

David J. Kappos
*Director of the United States Patent and Trademark Office*